(12) United States Patent
Peng et al.

(10) Patent No.: US 11,339,486 B2
(45) Date of Patent: May 24, 2022

(54) POROUS AMORPHOUS METALLIC ELECTROCATALYTIC MATERIALS FOR WATER ELECTROLYSIS

(71) Applicants: Zhenmeng Peng, Hudson, OH (US); Fei Hu, Jiangxi (CN)

(72) Inventors: Zhenmeng Peng, Hudson, OH (US); Fei Hu, Jiangxi (CN)

(73) Assignee: The University of Akron, Akron, OH (US)

(*) Notice: Subject to any disclaimer, the term of this patent is extended or adjusted under 35 U.S.C. 154(b) by 0 days.

(21) Appl. No.: 16/815,553

(22) Filed: Mar. 11, 2020

(65) Prior Publication Data

US 2020/0291536 A1 Sep. 17, 2020

Related U.S. Application Data

(60) Provisional application No. 62/816,475, filed on Mar. 11, 2019.

(51) Int. Cl.
| | |
|---|---|
| *C25B 11/061* | (2021.01) |
| *C25B 11/031* | (2021.01) |
| *C25B 1/04* | (2021.01) |
| *C25B 9/17* | (2021.01) |

(52) U.S. Cl.
CPC .............. *C25B 11/061* (2021.01); *C25B 1/04* (2013.01); *C25B 9/17* (2021.01); *C25B 11/031* (2021.01)

(58) Field of Classification Search
None
See application file for complete search history.

(56) References Cited

U.S. PATENT DOCUMENTS

2020/0398257 A1* 12/2020 Lu .................. B01J 35/0013

FOREIGN PATENT DOCUMENTS

CN 106609346 A * 5/2017 ............. C22C 45/00

OTHER PUBLICATIONS

Yang et al, Efficient Electrocatalytic Oxygen Evolution on Amorphous Nickel-Cobalt Binary Oxide Nanoporous Layers, ACS Nano, vol. 8, No. 9, Aug. 2014, pp. 9518-9523 (Year: 2014).*
Hu et al, Amorphous Metallic NiFeP: A Conductive Bulk Material Achieving High Activity for Oxygen Evolution Reaction in Both Alkaline and Acidic Media, Advanced Materials, vol. 29, No. 32, 1606570, Jun. 2017, pp. 1-9 (Year: 2017).*

(Continued)

*Primary Examiner* — Harry D Wilkins, III
(74) *Attorney, Agent, or Firm* — Renner Kenner Greive Bobak Taylor & Weber

(57) ABSTRACT

An electrocatalytic material includes a bulk material metal including at least one metal, wherein the bulk material metal is in an amorphous form and includes mesopores. A method for making an electrocatalytic material includes forming an amorphous bulk material metal, and forming mesopores in the amorphous bulk material metal. The bulk material metal may in some instances be selected from an alloy of at least one metal and at least one non-metal selected from phosphorus, boron, nitrogen, carbon, and any combination thereof. The at least one metal may in some instances be selected from iron, cobalt, nickel, copper, zinc, titanium, manganese, molybdenum, niobium, zirconium, and any combination thereof.

8 Claims, 3 Drawing Sheets

(56) References Cited

OTHER PUBLICATIONS

Hu et al, Supporting Information for Amorphous Metallic NiFeP: A Conductive Bulk Material Achieving High Activity for Oxygen Evolution Reaction in Both Alkaline and Acidic Media, Advanced Materials, vol. 29, No. 32, 1606570, Jun. 2017, pp. 1-16 (Year: 2017).*

Chen, Yi, Chemical preparation and characterization of metal-metalloid ultrafine amorphous alloy particles, Catalysis Today, vol. 44, Issues 1-4, Sep. 1998, pp. 3-16 (Year: 1998).*

* cited by examiner

POROUS AMORPHOUS METALLIC ELECTROCATALYTIC MATERIALS FOR WATER ELECTROLYSIS

CROSS-REFERENCE TO RELATED APPLICATIONS

The present application claims the benefit of U.S. Provisional Patent Application No. 62/816,475, filed Mar. 11, 2019.

FIELD OF THE INVENTION

The present disclosure is directed in general to catalysts for alkaline hydrolysis, and, more particularly, to nanostructured catalysts.

BACKGROUND OF THE INVENTION

Sustainable fuel is needed to resolve the increasing crisis of fossil fuel shortage and environmental pollution. Hydrogen production by electrochemical water splitting is one attractive solution with the mission of replacing noble metal-based catalysts (e.g., Pt, $IrO_2$, $RuO_2$) with earth-rich materials and in the meantime achieving high activity and stability for both hydrogen evolution reaction (HER) and oxygen evolution reaction (OER).

Electrolytic cells are versatile components for OER and HER. Platinum group metal (PGM) electrocatalysts such as $IrO_2$ and $RuO_2$ are at present state-of-the-art OER catalysts, but their scarcity and high-cost are seriously restricting large-scale application. Less costly alternatives, in particular transition metal-based materials, have moved the technology forward toward practical oxygen evolution in recent years. For instance, transition metal oxides, hydroxide/oxyhydroxides, and phosphates have been intensively investigated for their OER properties, but the substandard conductivity of these materials negatively affects their catalytic performance. There have been active research efforts toward improving the conductivity property of these materials, which were found to inevitably induce surface oxidation/passivation that brings on a critical concern of catalyst degradation. For instance, fresh $Co_{1-x}Fe_x(OOH)$ films were observed to lose 18~38% of the initial mass caused by dissolution after only 2 h in OER condition. Perovskites SrMTiO (M=Co, Fe) showed varied stability properties in alkaline electrolyte. The universal corrosion of the oxide catalysts has been attributed to the thermodynamic instability of the oxygen anion in the metal oxide lattice.

There is a need in the art for electrocatalytic materials with acceptable conductivities and performance in OER and HER. There is a need for electrocatalytic materials less affected by unwanted oxidation of the conductive metals forming the catalyst.

SUMMARY OF THE INVENTION

In a first embodiment, the present invention provides an electrocatalytic material including a bulk material metal including at least one metal, wherein the bulk metal is in an amorphous form and includes mesopores.

In a second embodiment, the present invention provides an electrocatalytic material as in any embodiment above, wherein the bulk material metal is selected from an alloy of at least one metal and at least one non-metal selected from phosphorus, boron, nitrogen, carbon, and any combination thereof.

In a third embodiment, the present invention provides an electrocatalytic material as in any embodiment above, wherein the at least one metal is selected from iron, cobalt, nickel, copper, zinc, titanium, manganese, molybdenum, niobium, zirconium, and any combination thereof.

In a fourth embodiment, the present invention provides an electrocatalytic material as in any embodiment above, wherein the bulk material metal has a ratio of metal to non-metal of from 4:1 to 1:4.

In a fifth embodiment, the present invention provides an electrocatalytic material as in any embodiment above, wherein the bulk material metal is selected from NiFeB, NiFeP, and NiFePB.

In a sixth embodiment, the present invention provides an electrocatalytic material as in any embodiment above, wherein the bulk material metal has a nickel to iron ratio of from 1:10 to 10:1.

In a seventh embodiment, the present invention provides an electrocatalytic material as in any embodiment above, wherein the bulk material metal has a phosphorus to boron ratio of from >0:1 to 1:>0. In other embodiments, the bulk material metal has a phosphorus to boron ratio of from 1:3 to 3:1.

In an eighth embodiment, the present invention provides an electrocatalytic material as in any embodiment above, wherein a porosity of the electrocatalytic material is characterized by a surface area per mass of the electrocatalytic material from 0.01 m2/g to 100 m2/g.

In a ninth embodiment, the present invention provides an electrocatalytic material as in any embodiment above, wherein the electrocatalytic material has a thickness and a width, and a thickness to width ratio of from 1:100 to 1:1,000,000.

In a tenth embodiment, the present invention provides an electrocatalytic material as in any embodiment above, wherein at least a surface portion of the electrocatalytic material is an oxidized layer.

In an eleventh embodiment, the present invention provides an electrocatalytic material as in any embodiment above, wherein the oxidized layer is from 2 nm to 50 nm thick.

In a twelfth embodiment, the present invention provides an electrocatalytic material as in any embodiment above, wherein the oxidized layer forms a shell over the bulk material metal, wherein the bulk material metal is a core.

In a thirteenth embodiment, the present invention provides an electrocatalytic material as in any embodiment above, wherein the core has lower ohmic resistance than the shell.

In a fourteenth embodiment, the present invention provides an electrocatalytic material as in any embodiment above, wherein the shell protects the core from further oxidation.

In a fifteenth embodiment, the present invention provides a method for making an electrocatalytic material as in any embodiment above, including forming an amorphous bulk material metal; and forming mesopores in the amorphous bulk material metal.

In a sixteenth embodiment, the present invention provides a method for making an electrocatalytic material as in any embodiment above, wherein the step of forming an amorphous bulk material metal is performed by melt spinning.

In a seventeenth embodiment, the present invention provides a method for making an electrocatalytic material as in any embodiment above, wherein the melt spinning further comprises: providing an inert atmosphere or vacuum atmosphere; providing a mixture comprising at least one or more metals selected from iron, cobalt, nickel, copper, zinc, titanium, manganese, molybdenum, niobium, zirconium, and any combination thereof, and at least one or more non-metals selected from phosphorus, boron, nitrogen, carbon, and any combination thereof; melting the mixture to form a molten mixture; and quenching the molten mixture by contacting the molten mixture with a spinning surface that is kept at a low temperature, wherein the molten mixture to undergoes a phase change from liquid to solid in less than one second when contacted with the spinning surface In an eighteenth embodiment, the present invention provides a method for making an electrocatalytic material as in any embodiment above, wherein the step of forming mesopores includes nanoetching, wherein nanoetching comprises contacting the amorphous bulk material metal with a strong acid solution.

In a nineteenth embodiment, the present invention provides a method for making an electrocatalytic material as in any embodiment above, wherein the strong acid solution comprises a strong acid selected from HNO3, H2SO4, and HCl, and combinations thereof.

In a twentieth embodiment, the present invention provides a method for making an electrocatalytic material as in any embodiment above, wherein the strong acid solution is at a concentration of at least or greater than 1 M.

In a twenty-first embodiment, the present invention provides a method for making an electrocatalytic material as in any embodiment above, wherein the strong acid solution is contacted with the amorphous bulk material metal for at least one minute.

In a twenty-second embodiment, the present invention provides a method for making an electrocatalytic material as in any embodiment above, wherein a temperature of the strong acid solution is from 20° C. to 100° C.

In a twenty-third embodiment, the present invention provides a method for making an electrocatalytic material as in any embodiment above, wherein a resultant porosity provides the electrocatalytic material with a surface area per mass of from 0.01 m2/g to 100 m2/g.

In a twenty-fourth embodiment, the present invention provides a method for producing hydrogen gas as in any embodiment above, including providing a reactor; wherein the reactor further comprises: an anode; a cathode; and an alkaline electrolyte; wherein the anode is an electrocatalytic material, and wherein the electrocatalytic material comprises a porous amorphous bulk material metal; and performing an alkaline electrolysis reaction to produce hydrogen gas.

In a twenty-fifth embodiment, the present invention provides a method for producing hydrogen gas as in any embodiment above, wherein the porous amorphous bulk material metal includes mesopores.

In a twenty-sixth embodiment, the present invention provides a method for producing hydrogen gas as in any embodiment above, wherein the porous amorphous bulk material metal has a porosity characterized by a surface area per mass of from 0.01 m2/g to 100 m2/g.

In a twenty-seventh embodiment, the present invention provides a method for producing hydrogen gas as in any embodiment above, wherein the porous amorphous bulk material metal has a thickness and a width and a thickness to width ratio of from 1:100 to 1:1,000,000.

In a twenty-eighth embodiment, the present invention provides a method for producing hydrogen gas as in any embodiment above, wherein the porous amorphous bulk material metal has at least a surface portion that is an oxidized layer.

In a twenty-ninth embodiment, the present invention provides a method for producing hydrogen gas as in any embodiment above, wherein the oxidized layer is from 2 nm to 50 nm thick.

In a thirtieth embodiment, the present invention provides a method for producing hydrogen gas as in any embodiment above, wherein the oxidized layer forms a shell over the bulk metal material, wherein the bulk metal material is a core.

In a thirty-first embodiment, the present invention provides a method for producing hydrogen gas as in any embodiment above, wherein the core has lower ohmic resistance than the shell.

In a thirty-second embodiment, the present invention provides a method for producing hydrogen gas as in any embodiment above, wherein the shell protects the core from further oxidation.

DETAILED DESCRIPTION OF ILLUSTRATIVE EMBODIMENTS

Figure 1:
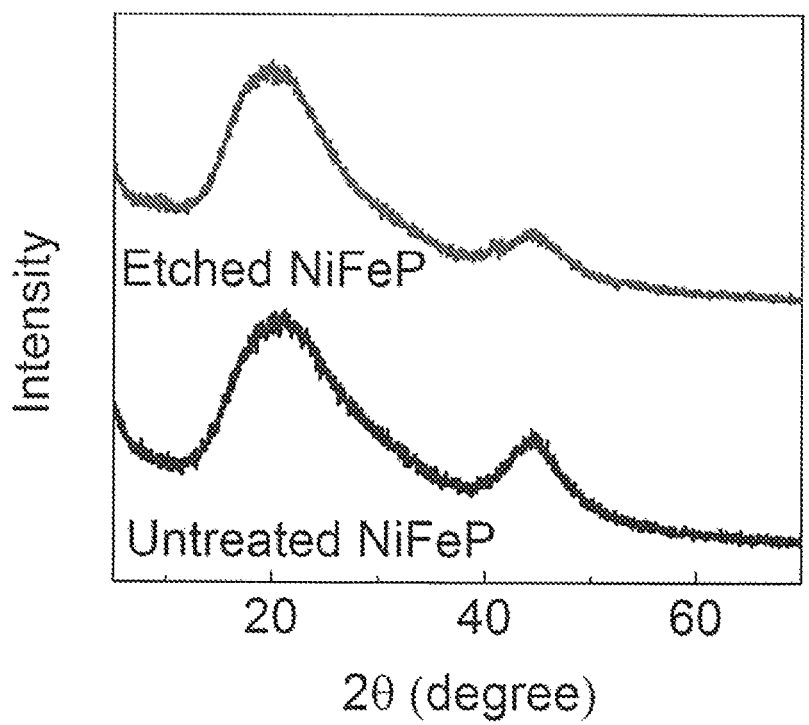
FIG. 1 shows the X-ray diffraction patterns for (a) the untreated and (b) the etched bulk NiFeP.

The present invention provides electrocatalytic materials and corresponding methods of preparing and methods of operation. The electrocatalytic materials may be particularly useful as electrodes, particularly the anode for an oxygen evolution reaction (OER), in alkaline hydrolysis processes, to generate hydrogen gas.

Advantageously, the present invention provides an electrocatalytic material that can be used directly as electrodes, exhibit coupling effects and enhanced electron transfer efficiency. Further, the electrocatalytic material of the present invention exhibits reduced contact resistance, high aspect ratio, abundant surface activity sites, and accessibility of reactants and products. Further, the present invention provides a superaerophobic surface, which lowers gas bubble size and bubble adhesive force by forming a discontinuous triple phase contact line that facilitates gas release and enhances the activity and stability in gas evolution reactions.

Electrocatalytic Material

In one or more embodiments, the electrocatalytic material includes a bulk material metal including at least one metal. In one or more embodiments, the bulk material metal is characterized by an amorphous bulk structure having mesopores.

In one or more embodiments, the bulk material metal is a three-dimensional porous structure, wherein the pores are characterized as mesopores or micropores defined herein as having pore diameters of 2 nm to 300 nm. In one or more embodiments, the pores are mesopores having pore diameters of 2 to 50 nm. In one or more embodiments, the pores are mesopores of from 5 nm to 25 nm.

In one or more embodiments, the bulk material metal is an alloy of at least one metal and at least one non-metal. In one or more embodiments, the at least one metal is selected from iron, cobalt, nickel, copper, zinc, titanium, manganese, molybdenum, niobium, zirconium, and any combination thereof. In one or more embodiments, the at least one non-metal is selected from phosphorus, boron, nitrogen, carbon, and any combination thereof.

In one or more embodiments, the bulk material metal has a ratio of metal to non-metal of from 4:1 to 1:4. In one or more embodiments, the bulk material metal has a ratio of metal to non-metal of from 3:1 to 1:3. In one or more embodiments, the bulk material metal has a ratio of metal to non-metal of from 2:1 to 1:2. In one or more embodiments, the bulk material metal has a ratio of metal to non-metal of 1:1.

In one or more embodiments, the bulk material metal is selected from NiFeB, NiFeP, and NiFePB. In one or more embodiments, the bulk material metal has a nickel to iron ratio of from 1:10 to 10:1. In one or more embodiments, the bulk material metal has a nickel to iron ratio of from 1:9 to 9:1. In one or more embodiments, the bulk material metal has a nickel to iron ratio of from 1:8 to 8:1. In one or more embodiments, the bulk material metal has a nickel to iron ratio of from 1:7 to 7:1. In one or more embodiments, the bulk material metal has a nickel to iron ratio of from 1:6 to 6:1. In one or more embodiments, the bulk material metal has a nickel to iron ratio of from 1:5 to 5:1. In one or more embodiments, the bulk material metal has a nickel to iron ratio of from 1:4 to 4:1. In one or more embodiments, the bulk material metal has a nickel to iron ratio of from 1:3 to 3:1. In one or more embodiments, the bulk material metal has a nickel to iron ratio of from 1:2 to 2:1. In one or more embodiments, the bulk material metal has a nickel to iron ratio of 1:1.

In one or more embodiments, the bulk material metal is selected from NiFeB, NiFeP, and NiFePB. In one or more embodiments, the bulk material metal is NiFePB, and has a phosphorus to boron ratio of from 1:greater than 0 to greater than 0:1.

In one or more embodiments, the electrocatalytic material is characterized by a porosity of from 0.01 $m^2/g$ to 100 $m^2/g$. In one or more embodiments, the electrocatalytic material is characterized by a porosity of from 1 $m^2/g$ to 25 $m^2/g$. In some embodiments, this measurement has been calculated as a Brunauer-Emmett-Teller (BET) surface area.

In one or more embodiments, the electrocatalytic material has a thickness and a width. In one or more embodiments, the electrocatalytic material has a thickness to width ratio of from 1:100 to 1:1,000,000. In some embodiments, the thickness is from about 10 micrometers to about 1 mm. In some embodiments, the width is from about 10 cm to 5 meters.

In one or more embodiments, the electrocatalytic material has an oxidized layer. In one or more embodiments the oxidized layer is highly amorphous. In one or more embodiments, the oxidized layer contains oxide and hydroxide species. In one or more embodiments the mesopores are active sites. In one or more embodiments the active sites are formed in the oxidized layer. In one or more embodiments, the oxidized layer has a thickness of from 2 nm to 50 nm.

In some embodiments, the oxide layer thickness is preferred to be as thin as possible to minimize the ohmic loss within the oxide layer. However, the practical oxide layer thickness is dependent on the metallic material type and the operation conditions, and can vary significantly.

In one or more embodiments, the oxidized layer forms a shell over the bulk material metal, the bulk material metal being a core. In one or more embodiments, the core exhibits excellent electrical conductivity for efficient electron transfer between the core and surface active sites in the shell, which advantageously helps protect the core from oxidative degradation. In one or more embodiments, the core has a lower ohmic resistance than the shell. The phosphide and/or boride helps prevent the core from oxidative degradation due to their excellent corrosion resistance.

In one or more embodiments, the porous amorphous bulk material metal is NiFeP. In one or more embodiments, the ratio of nickel to iron is 1:1. In one or more embodiments, the ratio of metal to non-metal is 4:1. In one or more embodiments, the porous amorphous bulk material metal has an oxidized layer. In one or more embodiments, the oxidized layer contains oxide and hydroxide species. In one or more embodiments, the oxidized layer forms a shell over the porous amorphous bulk material metal core. In one or more embodiments, the porous amorphous bulk material metal has mesopores formed in the oxidized layer.

In one or more embodiments, the porous amorphous bulk material metal is NiFeP. In one or more embodiments, the ratio of nickel to iron is 1:1. In one or more embodiments, the ratio of metal to non-metal is 3:1. In one or more embodiments, the porous amorphous bulk material metal has an oxidized layer. In one or more embodiments, the oxidized layer contains oxide and hydroxide species. In one or more embodiments, the oxidized layer forms a shell over the porous amorphous bulk material metal core. In one or more embodiments, the porous amorphous bulk material metal has mesopores formed in the oxidized layer.

In one or more embodiments, the porous amorphous bulk material metal is NiFeB. In one or more embodiments, the ratio of nickel to iron is 1:1. In one or more embodiments, the ratio of metal to non-metal is 3:1. In one or more embodiments, the porous amorphous bulk material metal has an oxidized layer. In one or more embodiments, the oxidized layer contains oxide and hydroxide species. In one or more embodiments, the oxidized layer forms a shell over the porous amorphous bulk material metal core. In one or more embodiments, the porous amorphous bulk material metal has mesopores formed in the oxidized layer.

In one or more embodiments, the porous amorphous bulk material metal is NiFePB. In one or more embodiments, the ratio of nickel to iron is 1:1. In one or more embodiments, the ratio of metal to non-metal is 3:1. In one or more embodiments, the ratio of phosphorus to boron is 1:3. In one or more embodiments, the porous amorphous bulk material metal has an oxidized layer. In one or more embodiments, the oxidized layer contains oxide and hydroxide species. In one or more embodiments, the oxidized layer forms a shell over the porous amorphous bulk material metal core. In one or more embodiments, the porous amorphous bulk material metal has mesopores formed in the oxidized layer.

Method of Preparing

Generally, the electrocatalytic materials of the present invention may be prepared by forming an amorphous bulk material metal and then forming pores within the amorphous bulk material metal.

In one or more embodiments, forming an amorphous bulk material metal includes fast quenching techniques. Such techniques provide a resultant product that is an amorphous structure.

In one or more embodiments, forming an amorphous bulk material metal includes melt spinning. In one or more embodiments, melt spinning includes providing at least one metal selected from iron, cobalt, nickel, copper, zinc, titanium, manganese, molybdenum, niobium, zirconium, and any combination thereof. The metals may be provided in their pure solid form. In one or more embodiments, melt spinning includes providing at least one non-metal selected from phosphorus, boron, nitrogen, carbon, and any combination thereof. The non-metals may be provided in their pure form. Further, the metals and non-metals may be provided as a crystalline alloy.

In one or more embodiments, melt spinning further includes melting the at least one metal, at least one non-metal and any alloys of the at least one metal and at least one non-metal to form a molten mixture. In one or more embodiments, the molten mixture is contacted with a spinning surface. In one or more embodiments, the spinning surface is actively cooled to a low temperature so that when the molten mixture contacts the spinning surface, the molten mixture undergoes a rapid phase change from liquid to solid in less than one second. This rapid phase change creates an amorphous bulk material metal. The degree of amorphousness can be controlled by adjusting the amounts of the precursor metals and non-metals, the rate of spin of the cooled surface, the rate of cooling of the cooled surface.

In one or more embodiments, mesopores are formed in the amorphous bulk material metal through nanostructuring. In one or more embodiments, nanostructuring includes nano-etching, electron-beam patterning, and nanostructure synthesis.

In one or more embodiments, the mesopores are formed though nanoetching with a strong acid solution. In one or more embodiments, the strong acid solution includes a strong acids at a concentration of 1 M (mol/L) or more. In one or more embodiments, the strong acid is $HNO_3$, $H_2SO_4$, and HCl, and combinations thereof. In one or more embodiments, the strong acid solution includes acetic acid and acetone.

In one or more embodiments, the resulting porous structure after nanoetching is tuned by varying the strong acid concentration, the strong acid solution bath temperature, and the etching time. In one or more embodiments, the strong acid concentration is from 1 M to 25 M. In one or more embodiments, the strong acid solution bath temperature is from 20° C. to 100° C. In one or more embodiments, the etching time is at least one minute. In one or more embodiments, the etching time is at least ten minutes.

In one or more embodiments, the resultant porosity of nanoetching provides the electrocatalytic material with a surface area per mass of from 0.01 $m^2/g$ to 100 $m^2/g$. In one or more embodiments, the electrocatalytic material is characterized by a porosity of from 1 $m^2/g$ to 25 $m^2/g$.

Hydrogen Gas Production (HER/OER)

In one or more embodiments, the present invention provides an electrocatalytic material for use in producing hydrogen gas through a water splitting reaction. In one or more embodiments, producing hydrogen gas includes providing a water splitting reactor. In one or more embodiments, providing a reactor includes providing an anode, a cathode, an alkaline electrolyte. In one or more embodiments, the reactor is used to perform an alkaline electrolysis reaction to produce hydrogen gas.

In one or more embodiments, providing an alkaline electrolyte includes selecting at least one of LiOH, NaOH, KOH.

In one or more embodiments, providing an anode includes providing an electrocatalytic material. In one or more embodiments, providing an electrocatalytic material includes providing a porous amorphous bulk material metal. In one or more embodiments, the porous amorphous bulk material metal includes mesopores. In one or more embodiments, the porous amorphous bulk material metal has a porosity characterized by a surface area per mass of from of from 0.01 $m^2/g$ to 100 $m^2/g$. In one or more embodiments, the porous amorphous bulk material metal is characterized by a porosity of from 1 $m^2/g$ to 25 $m^2/g$. In one or more embodiments the porous amorphous bulk material metal has a thickness and a width and a thickness to width ratio of from 1:100 to 1:1,000,000.

In one or more embodiments, the porous amorphous bulk material metal is an alloy of at least one metal and at least one non-metal. In one or more embodiments, the at least one metal is selected from iron, cobalt, nickel, copper, zinc, titanium, manganese, molybdenum, niobium, zirconium, and any combination thereof. In one or more embodiments, the at least one non-metal is selected from phosphorus, boron, nitrogen, carbon, and any combination thereof.

In one or more embodiments, the bulk material metal is selected from NiFeB, NiFeP, and NiFePB.

In one or more embodiments, the electrocatalytic material has an oxidized layer. In one or more embodiments, the oxidized layer has a thickness. In one or more embodiments, the oxidized layer has a thickness of from 2 nm to 50 nm.

In one or more embodiments, the oxidized layer forms a shell over the bulk material metal. In one or more embodiments, the bulk material metal is a core. In one or more embodiments, the core exhibits excellent electrical conductivity for efficient electron transfer between the core and surface active sites in the shell, which advantageously prevents the core from oxidative degradation. In one or more embodiments, the core has a lower ohmic resistance than the shell.

In light of the foregoing, it should be appreciated that the present invention significantly advances the art by providing an electrocatalytic material that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

Example One—NiFeP

Porous $NiFeO_x$@NiFeP was synthesized using amorphous NiFeP bulk material as precursor. NiFeP long strips, about 5 mm in width and 20 μm in thickness, were obtained by melting spinning NiFeP ingots on a rotating Cu plate in vacuum atmosphere. NiFeP ingots were empirically prepared by melting Fe, Ni, $Fe_3P$, $Ni_3P$ lumps with scheduled stoichiometric ratios in an electric-arc furnace and then fast quenched down to room temperature on the rotating drum. The obtained NiFeP long strips were then etched in concentrated $H_2SO_4$, $HNO_3$, and HCl acids. The acid concentration was adjusted to achieve an appropriate etching rate for pore structure generation. The concentrations of $H_2SO_4$, $HNO_3$, and HCl used in this study were 90%, 55%, and 90%, respectively.

Scanning electronic microscopy (SEM) images and energy dispersive X-ray spectroscopy (EDS) profiles were collected on an FEI Quanata 200 FEG electron microscope operated at 20 kV. High-resolution transmission electron microscopy (HRTEM) images and EDS mapping profiles were obtained on a JEOL JEM-ARM200F Cold-FE high-resolution transmission microscope operated at 200 kV. X-ray diffraction (XRD) patterns were recorded on a Bruker AXS Dimension D8 X-ray diffractometer operating at 40 kV and 35 mA (Cu Kα, λ=0.154184 nm). X-ray photoelectron spectrometer (XPS) data was collected on a PHI 5000 Versaprobe II X-ray photoelectron spectrometer. Surface area was measured on Brunauer-Emmett-Teller (BET, ASAP2010, Micromeritics).

The electrocatalytic properties were examined in a three-electrode system on an electrochemical workstation (CHI 760) in an alkaline electrolyte of 1.0 M NaOH aqueous solution or an acid electrolyte of 0.5 M $H_2SO_4$ aqueous solution. A carbon electrode and an Ag/AgCl electrode were used as counter and reference electrodes, respectively. The Ag/AgCl reference electrode was calibrated using a homemade reversible hydrogen electrode (RHE) by coupling with a Pt wire as a counter electrode. The difference between the Ag/AgCl reference potential and the RHE potential was then corrected. The porous $NiFeO_x$@NiFeP bulk solids made as above were directly used as a working electrode. Linear scan voltammetry (LSV) was conducted at a scan rate of 1 $mVs^{-1}$ and corrected for iR losses. Electrochemical impedance spectra (EIS) were collected in the frequency range of 100 kHz to 100 mHz with an AC voltage amplitude of 10 mV at potentials of 300 mV versus Ag/AgCl electrode. Cyclic voltammetry (CV) curves were recorded with a sweep rate of 50 $mVs^{-1}$. Current densities were calculated using geometric surface areas, and electrochemical active surface areas (ECSAs) were estimated by double-layer capacitance measurements. Within ±50 mV versus open-circuit potential (OCP), a series of CVs were conducted at sweep rates of 50~2000 $mVs^{-1}$ to collect the capacitance charging and discharging currents. The currents at the OCP were plotted against the scan rates, whose slopes were used for determining double-layer capacitance of the samples.

Porous $NiFeO_x$@NiFeP (NFPS) was synthesized using amorphous bulk NiFeP (NFP) as the starting material. The amorphous feature of the NiFeP was confirmed using HRTEM and XRD (FIG. 1) characterizations. Further, elemental mapping showed that Ni, Fe and P atoms were homogeneously distributed. Before etching, ab initio molecular dynamics (AIMD) simulations were performed using Vienna ab-initio simulation pack (VASP) for achieving atomic-level insights into the degradation mechanism of amorphous NiFeP and providing an evaluation of the catalyst durability property. A supercell containing 100 atoms was constructed to simulate the amorphous structure, with the electron spins taken into account in the simulation. Interactions between individual atoms are described with PAW-PBE type pseudo-potentials on generalized gradient approximation basis. The simulated amorphous $Ni_{40}Fe_{40}P_{20}$ structure possessed a system total energy of −671.49 eV. In order to investigate the structural stability, energy deviation from the system total energy was calculated by removing individual atoms from the surface. The system exhibited a significant increase when removing Ni, Fe, or P, suggesting unfavored thermodynamic impact on the stability of the amorphous NiFeP. Interestingly, the removal of Fe and Ni atoms caused the biggest and the smallest energy changes (8.93±0.30 eV/Fe atom vs. 6.20±0.24 eV/Ni atom). This indicates that Fe bonds stronger to their neighbor atoms and is more difficult to leach, which is attributed to a stronger Fe—P bond compared to Ni—P bond. Based on these simulation results, it is expected that the amorphous NiFeP can be selectively etched to create a 3D porous framework.

Porous $NiFeO_x$@NiFeP was synthesized by immersing the amorphous NiFeP bulk in concentrated $H_2SO_4$, $HNO_3$, and HCl acids. The obtained products were screened by quantifying the final composition, as being summarized in Table 1.

TABLE 1

$NiFeO_x$@NiFeP sample composition after etching in H2SO4, HNO3, and HCl solutions

| Element (at. %) | 90% H2SO4 | 55% HNO3 | 90% HCl |
|---|---|---|---|
| O | 47.16 | 26.27 | 4.97 |
| P | 16.14 | 13.38 | 17.68 |
| S/N/Cl | 2.49 | / | / |
| Fe | 21.33 | 29.87 | 39.79 |
| Ni | 12.88 | 30.49 | 37.46 |

Figure 2:
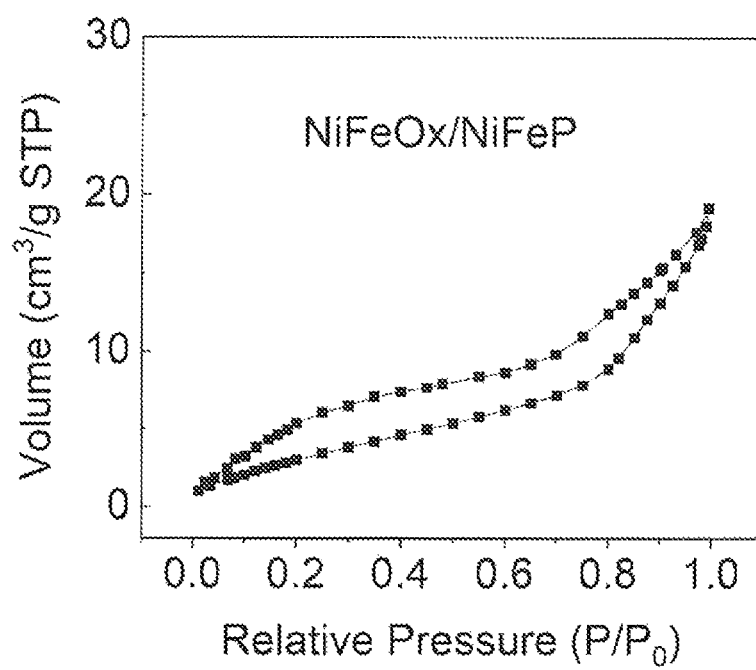
FIG. 2 provides $N_2$ adsorption-desorption isotherms for the NiFeOx/NiFeP framework in the experimental.

The Ni/Fe ratio remained nearly unchanged when $HNO_3$ and HCl etchant solutions are used. In contrast, the Ni/Fe ratio decreased with use of $H_2SO_4$ solution. By varying the $H_2SO_4$ concentration, bath temperature and etching time, the elemental contents in the final products are varied as shown in Tables 2, 3, and 4. Ni seems preferentially dissolved when the $H_2SO_4$ concentration is higher than 70% and the bath temperature is higher than 70° C., which is consistent with the AIMD simulations. With an increase in the etching time, the oxygen percentage and Ni/Fe ratio firstly increase and then decrease, inferring a trade-off between nickel dissolution and pore creation. The highest porosity was obtained when the $Ni_{40}Fe_{40}P_{20}$ is etched for 12 h, evidenced by an 11.8-fold increase in the ECSA value compared to the pristine precursor. N2 adsorption-desorption measurement further confirms that the resulting sample exhibits a Brunauer-Emmett-Teller (BET) surface area of 13.27 m2/g with an average nanopore size of 6.94 nm (FIG. 2 and Table 5).

TABLE 2

The elemental content after etching in different concentrations of H2SO4 solution for 24 h.

| Element (%) (at. %) (at. %) (at. %) | Untreated | 30% | 50% | 70% | 90% |
|---|---|---|---|---|---|
| O | 6.85 | 8.94 | 10.65 | 50.02 | 47.16 |
| P | 18.57 | 18.32 | 17.57 | 10.78 | 16.14 |
| S | 0 | 0.15 | 0.1 | 9.52 | 2.49 |
| Fe | 37.61 | 37.56 | 36.95 | 18.03 | 21.33 |
| Ni | 36.97 | 35.02 | 34.73 | 11.65 | 12.88 |

TABLE 3

Composition of obtained $NiFeO_x$@NiFeP samples after being etched in 90% H2SO4 solution for 12 h at different bath temperatures.

| Element (at. %) | 30° C. | 50° C. | 70° C. | 90° C. |
|---|---|---|---|---|
| O | 5.82 | 10.90 | 27.91 | 29.88 |
| P | 18.74 | 19.02 | 20.61 | 25.84 |
| S | 0.13 | 0.32 | 7.34 | 2.73 |
| Fe | 38.81 | 35.88 | 27.35 | 26.92 |
| Ni | 36.51 | 33.87 | 16.79 | 14.64 |

TABLE 4

The elemental content after etching in 90%
H$_2$SO$_4$ solutions for 12 h by different etching times.

| Element (at. %) | 3 h | 6 h | 12 h | 24 h |
|---|---|---|---|---|
| O | 33.31 | 30.34 | 24.88 | 46.04 |
| P | 30.38 | 25.03 | 28.07 | 12.31 |
| S | 1.395 | 1.91 | 2.13 | 6.89 |
| Fe | 24.82 | 27.14 | 29.84 | 18.51 |
| Ni | 10.09 | 15.57 | 15.09 | 16.25 |

TABLE 5

BET surface area, pore volume, and average
pore size for the NiFeOx/NiFeP framework.

| | NiFeOx/NiFeP framework |
|---|---|
| BET surface volume (m$^2$/g) | 13.27 |
| Pore volume (cm$^3$/g) | 0.02708 |
| Average pore size (nm) | 6.94071 |

The obtained porous NiFeOx@NiFeP maintained the amorphous property, evidenced by the XRD pattern (FIG. 1) and selected area electron diffraction (SAED). The porous structure is characterized using HRTEM. A ~500 nm thick layer consisting of intertwined nanostructured scaffolds on the top of solid NiFeP substrate was observed in the SAED. This top layer shows a significantly lower image contrast compared with the NiFeP substrate, owing to the porous characteristic and likely a composition change. Some mesopores are also observed, which would facilitate efficient mass transfer by creating transport channels and lowering down the transport resistance. HRTEM showed a nanoporous framework with pore diameters of 20~25 nm, while EDS mapping in further confirmed the core-shell structure. The shell was about 2~10 nm in thickness and composed of Ni, Fe, 0, and a trace of P and S, evidenced by the detection of these elements using EDS. The shell is primarily mixed oxides of Ni and Fe, with trace amounts of P and S resulting from acid treatment, with such trace amounts being negligible. The strong acid treatment resulted in the generation of the pores as well as the oxidation of the material surface to form this thin oxide layer. Similar structures have been reported by chemical dealloying on Pt—Cu and Pt—Co alloys. See H. Ali-Löytty, M. W. et al., Ambient-Pressure XPS Study of a Ni—Fe Electrocatalyst for the oxygen evolution reaction, J. Phys. Chem. C 2016, 120, 2247-2253. This unique structure is referenced herein by using the nomenclature NiFeO$_x$@NiFeP. By disrupting the top nanoporous layer from the NiFeP substrate, these porous and amorphous structures can be characterized using TEM. The porous NiFeP framework can achieve exceptional activity and durability properties. The structural amorphousness creates dense under-coordinated surface sites that offer energetic flexibility to interact with reactants. The metallic skeleton provides excellent electrical conductivity for efficient electron transfer between the NiFeP skeleton and surface active sites in the ultrathin NiFeO$_x$ skin, which further prevents the metallic core from degradation. These features, together with a large active surface area resulting from the porous structure, lead to good reaction activity and structural stability.

Upon acquiring the structural information, XPS helps to understand the chemical environment information of the NiFeOx@NiFeP framework. The XPS revealed the presence of Ni, Fe, P, S, and O elements from the complete survey spectrum. High-resolution Ni 2p and Fe 2p XPS was deconvoluted into metallic states at peaks 853.2 (Fe—Fe) and 707.6 eV (Ni—Ni) respectively. Peaks observed at around 856.0 and 874.0 eV along with two satellite peaks at 861.4 and 879.7 eV were well fitted with Ni 2p3/2 and Ni 2p1/2 of the oxidized nickel. Peaks located at 711.4 and 723.9 eV and their corresponding shakeup resonance at 719.8 eV represented Fe 2p3/2 and Fe 2p1/2 in the oxidation state of iron, which corresponded to TEM observations. The P 2p spectrum was deconvoluted into three peaks at 133.0, 129.8 and 128.9 eV. Two peaks with lower binding energy were ascribed to that of metal phosphide, and a third peak designated to phosphate, respectively. A high resolution spectrum of S 2p showed two peaks centered at 162.9 and 161.7 eV that could be assigned to S 2p1/2 and S 2p3/2, respectively. A peak at 164.1 eV was attributed to metal-sulfur bond. An O 1s XPS spectra showed a peak at 531.5 eV, which was assigned to phosphate and hydroxyl species, and the peaks at about 530.5 and 532.2 eV were attributed to metal-O bond and absorbed O2, respectively.

The NiFeOx@NiFeP framework was evaluated for electrocatalytic properties in water electrolysis. Oxygen evolution reaction (OER) and hydrogen evolution reaction (HER) LSV curves in 1.0 M NaOH were plotted, and a current density of 10 mA·cm−2 was achieved with an overpotential of only 210 mV for OER and an overpotential of only 180 mV for HER, respectively. The Tafel slopes of 37.0 and 85.2 mV·dec−1 demonstrated favorable kinetic processes for OER and HER, respectively. In an acid electrolyte of 0.5 M H$_2$SO$_4$ solution, the NiFeOx@NiFeP electrodes gained a current density of 10 mA·cm$^2$ at 680 mV for OER and 100 mV overpotential for HER, respectively. Their corresponding Tafel slopes were 94.0 and 67.2 mV·dec$^{-1}$. The overpotential and Tafel slope were smaller than the documented NiFe-based catalysts in literature, indicating outstanding activity of the NiFeOx@NiFeP in this study. XPS spectra in further indicated that the HER and the OER have different active sites for water splitting, as obvious appearance of metallic Fe—Fe and Ni—Ni bonds were witnessed after HER and noticeable disappearance in non-metallic P and B occurred after OER. The XPS spectra of O 1s further proved that a higher percentage of M-O bond than H—O bond is generated after OER, representing in OER the active sites are (hydro)xide (oxides or hydroxides) rather than borides or phosphides.

XPS was also performed on the NiFeOx@NiFeP framework after OER in a 0.5 M H2SO4 electrolyte, and it was observed that the XPS spectra for Fe, Ni, P, and S were similar to the sample after HER, which indicated that the acidic media is more influenced for the outer oxides skin as severe dissolution might occur. To validate the hypothesis, the surface morphology of the NiFeOx@NiFeP framework before and after OER in the 0.5 M H$_2$SO$_4$ electrolyte were compared, and larger and more uniform nanopores and microcracks were observed after OER, inferring sample dissolution happens during OER. Table 6 shows there were close percentages of elements Ni, Fe, P, S except O for samples before and after OER in an acidic solution. It is speculated that the dissolution rate is faster than the oxide formation rate, resulting in inferior stability and the degradation of electrocatalysts in acidic media.

TABLE 6

Sample Compositions Based on EDS Quantitative Analyses.

| Element | Atomic ratio (%) | |
| --- | --- | --- |
| | Before OER | After OER |
| O K | 46.71 | 38.43 |
| P K | 26.47 | 24.87 |
| S K | 2.36 | 2.97 |
| Fe K | 17.39 | 20.67 |
| Ni K | 7.07 | 13.06 |

The stability of the NiFeOx/NiFeP framework in the alkaline electrolyte was also examined. Under the chronovoltametry testing condition, low overpotentials of 220 and 200 mV were needed for OER and HER to achieve 10 mA·cm$^2$ current density, respectively. Only slight increases in the overpotential (39.5 and 82.0 mV) would reach 100 mA·cm$^2$, which is in good agreement with the Tafel slopes. In light of the superior dual-functional HER and OER performance, the overall water splitting efficiency was tested. In 1.0 M NaOH electrolyte, the water electrolysis achieved 10 mA·cm$^2$ current density with 1.65 V cell voltage and was maintained for at least 600-h. This performance using the NiFeOx/NiFeP electrodes is significantly improved compared to other tested electrode materials including RuO2/Pt, Pt/Pt, and NiFeP/NiFeP and many other reported catalyst materials Table 7.

TABLE 7

HER, OER, and overall water splitting performances of the NiFeOx/NiFeP framework in this work, in comparison with representative literature data of high-performance electrocatalysts from recent publications.

| | Media | Overpotential (mV)@ 10 mA/cm$^2$ | | Overall Water Splitting potential (V) | Reference |
| --- | --- | --- | --- | --- | --- |
| | | HER | OER | | |
| NiFeOx/NiFeP Framework | 0.5M H$_2$SO$_4$ | 100 | 680 | / | This work |
| | 1.0M NaOH | 200 | 220 | 1.65 | |
| Ni-doped FeP/C hollow nanorods | 0.5M H$_2$SO$_4$ | 72 | / | | 7 |
| | 1.0M PBS | 117 | | | |
| | 1.0M KOH | 95 | | | |
| PANI/CoP Hybrid Nanowires | 0.5M H$_2$SO$_4$ | ~50 | / | | 8 |
| MoS$_{2(1-x)}$P$_x$ | 0.5M H$_2$SO$_4$ | 30 | / | | 9 |
| Carbon-incorporated Ni—CoP nanoboxes | 1.0M KOH | / | 330 | | 10 |
| NiPS$_3$@NiOOH Core-Shell Heterostructures | 0.1M KOH | / | 350 | | 12 |
| NiCoP/NF | 1.0M KOH | / | 280 | | 13 |
| Ni$_2$P | 1.0M KOH | / | 290 | | 14 |
| hierarchical Ni—Co—P hollow nanobricks | 1.0M KOH | 107 | 270 | 1.62 | 15 |
| CoP NS/CC | 1.0M KOH | 90 | 310 | 1.67~1.69 | 16 |
| | 0.5M H$_2$SO$_4$ | 88.7 | | | |
| 10%Cr—CoP 30%Fe—CoP | 1.0M KOH | 121 | | 1.67@100 mAcm-2 | 17 |
| Ni$_5$P$_4$ Films/Ni foil | 1.0M KOH | 150 | 330 | <1.7 | 18 |
| Co/CoP-5 | 1.0M KOH | 193 | 283 | 1.45 | 19 |
| | 1.0M PBS | 138 | / | | |
| | 0.5M H$_2$SO$_4$ | 178 | / | | |
| Ni$_{0.90}$Fe$_{0.10}$PS$_3$ NS | 1.0M KOH | 72 | 329 | / | 20 |
| Co$_{0.9}$S$_{0.58}$P$_{0.42}$ | 1.0M KOH | 139 | 266 | 1.59 | 21 |
| N—Ni$_3$S$_2$/NF | 1.0M KOH | 110 | / | 1.48 | 22 |

The outstanding activity and durability of the 3D nanoporous NiFeOx@NiFeP can be attributed to its unique integrated functions. First, the metallic NiFeP skeleton has the virtue of providing fast electron flow and minimizing the potential gradient between the current collector and active sites. The electrical conductivity of the NiFeOx@NiFeP electrode is 923.60 S/cm as measured by a four-point tester, which is slightly lower than the untreated NiFeP of 936.18 S/cm. EIS spectra showed a smaller EIS semicircle diameter in the high frequency as compared to NiFeP, confirming there is also much lower interface charge-transfer resistance and correspondingly fast reaction kinetics. Accordingly, the NiFeOx@NiFeP electrode was annealed at temperatures of 200~500° C. for 1 h in Ar atmosphere. A plot of electrochemical activity at different treatment temperatures validated there is a gradual deterioration of the electrochemical activity due to the loss of marco-conductivity, and the sample loses its activity when it is annealed at 500° C.

Secondly, the core-shell structure benefits the electrochemical activity with the lattice strain and the Mott-Schottky effect as compared to pure oxide catalysts. The outer oxide shell NiFeOx is typically semiconducting, with the work function being dramatically lower than that of metallic NiFeP. Thus in the NiFeOx@NiFeP structure, electrons flow through the metal/semiconductor interface due to the Mott-Schottky effect until the work function equilibrium is reached. The redistribution of electrons at the NiFeOx@NiFeP interface results in band bending, pulling down the valence band of NiFeOx. The electron redistribution at the NiFeOx@NiFeP interface can be directly demonstrated by the XPS analysis results. A shift of the Ni 2p from 711.4 eV to 711.3 and 711.0 eV occurs after OER and HER, respectively. In the meantime, the Fe 2p peaks shift from 856.0 eV to 856.2 and 855.8 eV, respectively, representing the rectifying contact at the NiFeOx/NiFeP interface. The work function of NiFeOx shell is thus lowered with obviously improved activity, which largely depends on electron donating ability of electrocatalyst to reactant molecules.

The durability of a catalyst is indicative of a permanent lifetime of an electrolyzer. The function-integrated structure of the NiFeOx@NiFeP exhibits the outstanding long-term durability because the amorphous oxide shell is stable in alkaline media but electrochemically active with electrons. A fast charge transfer avoids the accumulation of electrons in the solid/oxide/liquid interface. The oxide skin preventing penetrative oxidation of the metallic core, which in turn maintains the function-integrated structure and avoids structural degradation.

In summary, the present experiments obtained a porous amorphous NiFeO$_x$@NiFeP catalyst that is highly active and durable in both HER and OER, benefiting fromsynergic functional-structural effects. The direct bonding of $NiFeO_x$ active sites on etched 3D nanostructure channels offers sufficient surface area. The continuous electrically conductive framework promises a quick charge supply and short ion diffusion distance. Moreover, the under-coordinated oxide surface and the Mott-Schottky interface enhance the electronic configuration and assure fast catalysis kinetics. The $NiFeO_x$@NiFeP shows highly-efficient and ultra-stable overall water splitting activity, with a current density of 10 mA·cm$^{-2}$ being harvested at a cell voltage of 1.65 V for over 600-h in 1.0 M NaOH electrolyte. This work directs a way for bulk materials to gain a remarkable electrocatalytic activity and durability, and offers a better alteration to dramatically boost the efficiency of alkaline water splitting electrolyzer.

Example Two—NiFePB

Sample Preparation and Characterization:

Long strips (depth of 20 µm and width of 5 mm) of amorphous metallic NiFePB of varied compositions were obtained by melting spinning and rapidly quenching NiFePB ingots in an argon atmosphere. The NiFePB ingots were first prepared by mixing and melting Fe$_3$P and Ni$_3$P lumps (purity of 99%, Kojundo Chemical Laboratory Co., Ltd.), pure Ni, pure Fe, and pure B with different ratios in an argon atmosphere. The obtained samples were then activated in an acidic solution comprised of nitric acid, acetate acid, and acetone for 10 min. For comparison, NiFeOH and NiFe alloy foam (NFF) were prepared according to X. Lu, C. Zhao, Electrodeposition of hierarchically structured three-dimensional nickel-iron electrodes for efficient oxygen evolution at high current densities, Nat Commun, 2015, 6, 6616.

The samples were examined using SEM, HRTEM, EDS, XRD, and XPS. SEM images and EDS mapping profiles were collected on an FEI Quanata 200 FEG electron microscope operated at 20 kV. HRTEM images and EDS mapping profiles were collected on a JEOL JEM-ARM200F Cold-FE high-resolution transmission microscope operated at 200 kV. The X-ray diffraction (XRD) patterns were recorded on a Bruker AXS Dimension D8 X-ray diffractometer operating at 40 kV and 35 mA (Cu Kα, λ=0.154184 nm). XPS data were collected on a PHI 5000 Versaprobe II X-ray photoelectron spectrometer. After 1400-h OER, the electrolyte was measured by inductively coupled plasma mass spectrometry (ICP-MS) to evaluate the elements leaching.

Formation Energy Simulation:

The density functional theory (DFT) calculations were conducted with the Quantum ESPRESSO package, G. Paolo, et al. Quantum espresso: a modular and open-source software project for quantum simulations of materials. J. Phys. Condens. Matter, 2009, 21, 395502. The Generalized Gradient Approximation (GGA) method is applied with the Perdew-Burke-Ernzerhof (PBE) functional with Projector-Augmented Wave (PAW) sets from PSlibrary 0.3.1, A. Dal Corso, Pseudopotentials periodic table: From H to Pu. Comput. Mater. Sci., 2014, 95, 337-350. The bulk lattice of Fe, Ni, B, P, NiFeP, NiFeB, NiFePB, and NiFe single unit cells were optimized prior to property calculations. A plane-wave function cutoff of 80 Ry with a charge density cutoff of 800 Ry is applied to initiate the calculations, and the default k points automatically generated by QE software. The formation energy for NiFeP, NiFeB, NiFePB, and NiFe were calculated using the equation $\Delta Hf = Esystem - N'(M)[E(M)/N(M)]$, where Esystem is the energy of the studied system, E(M) is the energy of the energy of pure M (=Fe, Ni, B or P) unit cell, N(M) is the number of M atoms in the M unit cell, and N'(M) is the number of M atoms in the studied system unit cell.

Figure 3:
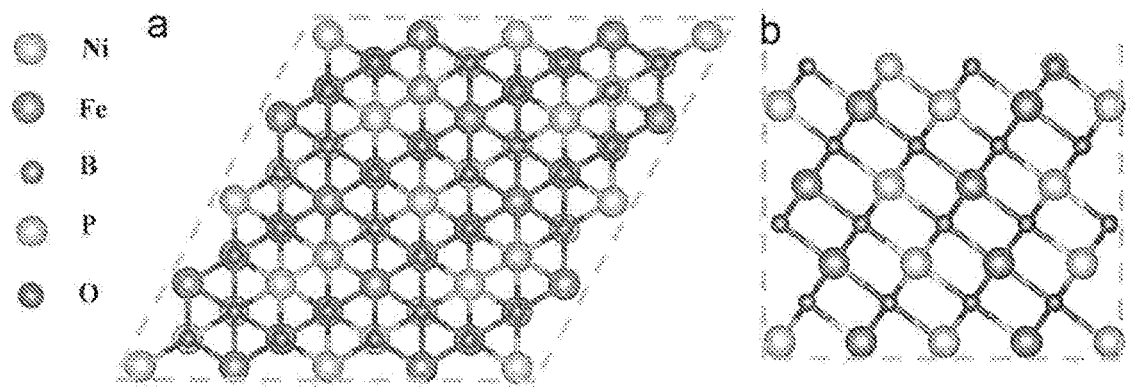
FIG. 3 provides a structural model for the activated NiFePB surface in the experimental, in a) side view and b) top view, showing the NiFeO (111) surface has a Ni:Fe:O atomic ratio of 1:1:2, and contains 16 oxygen atoms among which three atoms are replaced by P atoms and one atom is replaced by B atom.

Electronic Structure Simulations:

A cell containing four O atoms, two Ni atoms, and two Fe atoms were used for first-principles calculation. Considering the doped proportion and the location of doped atoms, a cubic supercell consisting of 4 cells (2×2×1) was adopted, with 32 atoms (8 Fe atoms, 8 Ni atoms, and 16 O atoms) in total. Three O atoms are replaced by P atoms in the single P doping model, while four O atoms are replaced by three P atoms and one B atom in the B—P co-doping model. The (111) surface was selected to study the effect of B doping on the catalytic activity of the OER. The structural model for the activated NiFePB is illustrated in FIG. 3. The four-layer structure containing 128 atoms is constructed. A vacuum layer of 20 Å was adopted in the direction perpendicular to the surface to avoid the interactions between periodic slabs. The doping concentration was consistent with the bulk doping. All DFT calculation was performed with the PBE functional using the VASP code. The PAW method was used to represent the core-valence electron interaction with electrons from O s2p4, B s2p1, P s2p3, Fe 3pd7s1, Ni 3pd8s2. The energy cutoff was set to be 500 eV. Convergence criterion for the energy and maximum force for the bulk optimization were set to 10-4 eV and 0.05 eV/A, respectively. Brillouin zone was sampled by G-centered meshes of 5×5×9 k-points for the bulk and 5×5×1 k-points for the surface. For the adsorption structure, k-points was selected to be 3×3×1. The LDA+U method was employed to calculate the on-site Coulomb correlation for the 3d electrons of Fe and Ni where the Coulomb repulsion energies U were selected as 3.71 eV and 8.0 eV, respectively. Dipole correction was adopted due to the asymmetric layer arrangement in the process of layer calculation.

Adsorption Structure Simulation:

The adsorptions of oxygen on the NiFeO (111) and the a-NiFePB (111) surfaces were studied. The bottom layers of atoms of the surface models were kept fixed to hold the characteristics of realistic surfaces, while the rest of the unit cell was allowed to be fully relaxed during the geometry optimizations.

XAFS Characterization:

Ni and Fe K-edge X-ray absorption fine structure (XAFS) measurements were performed at the beamline 1W1B in Shanghai Synchrotron Radiation Facility and 1W1B in Beijing Synchrotron Radiation Facility, China. The X-ray was monochromatized by a double-crystal Si (311) monochromator. The acquired XAFS data were processed according to the standard procedures using the WinXAS3.1 program. Theoretical amplitudes and phase-shift functions were calculated with the FEFF8.2 code using the crystal structural parameters of Ni2P and FeP. X-ray absorption measurements were acquired on the bending magnet beamline of the Materials Research Collaborative Access Team (MRCAT) at the Advanced Photon Source, Argonne National Laboratory. Photon energies were selected using a water-cooled, double crystal Si (111) monochromator, which was detuned by approximately 50% to reduce harmonic reflections. Measurements were made in transmission mode, and data points were acquired in three separate regions (energies relative to the elemental Ni K edge): a pre-edge region (−250 to −30 eV, step size=10 eV, dwell time=0.25 s), the XANES region (−30 to +30 eV, step size=0.5 eV, dwell time=0.25 s), and the EXAFS region (to 13 Å-1, step size=0.07 Å-1, dwell time=1s). The ionization chambers were optimized for the maximum current with the linear response (~1010 photons detected/sec) with 10% absorption (98% N2 and 2% Ar) in the incident ion chamber and 70% absorption (38% N2 and 62% Ar) in the transmission detector. A Ni foil spectrum (edge energy 8333.0 eV) was acquired simultaneously with each measurement for energy calibration. During fitting of the NiFePB, the metal-metal, meta-P distances were fixed as the same in the references in the Ni3P and Fe3P, and the metal-B distance was set identical to the Ni—P distance, and the coordination number of metal-B path and metal-P path was set as the same as the B/P molar ratio in the sample.

Electrochemical Measurement:

The OER performance was recorded in a three-electrode system in an alkaline electrolyte of 1.0-M NaOH electrolyte on an electrochemical workstation (CHI 760). A Pt mesh and an Ag/AgCl electrode served as the counter and reference electrodes, respectively. The reference electrode was calibrated to reversible hydrogen potential according to the Nernst equation. The a-NiFePB solid was directly used as a working electrode with the area of 1 cm2, which was ultrasonically washed in deionized water (Milli-Q) and ethanol three times for 5 min, respectively, to remove all residuals before the use. Linear scan voltammetry was conducted at a scan rate of 1 mVs−1 and corrected for iR losses. EIS was carried out in the frequency range of 100 kHz to 100 mHz with an AC voltage amplitude of 10 mV at potentials of 300 mV versus Ag/AgCl. CV curves were recorded with a sweep rate of 50 mVs−1. Current densities were calculated using geometric surface areas, and ECSAs were estimated by double-layer capacitance measurements. Within ±50 mV versus open-circuit potential (OCP), a series of CVs were performed at sweep rates of 50~2000 mVs−1 to collect the capacitance charging and discharging currents. The currents at the OCP were plotted against the scan rates, whose slopes were the double-layer capacitances of the samples.

Figure 4:
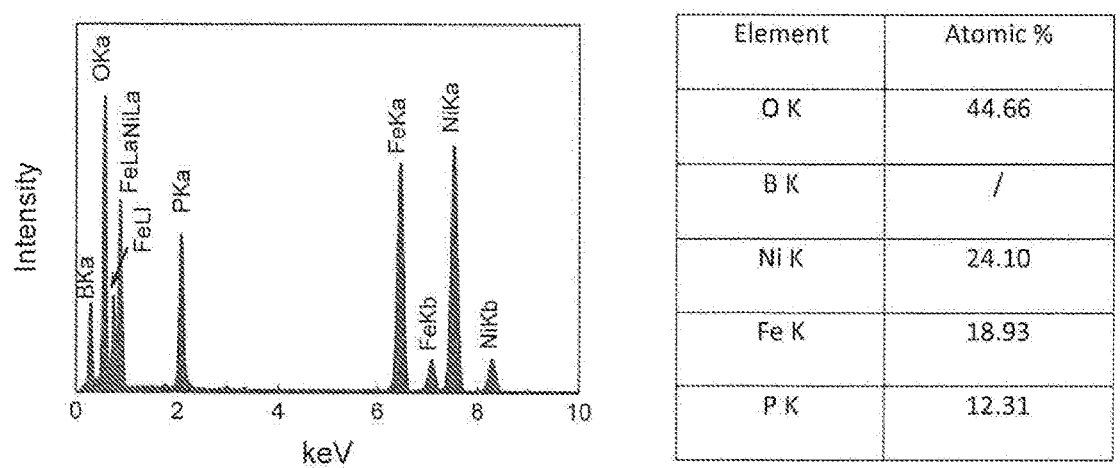
FIG. 4 provides a) EDS spectrum and b) atomic ratio of the activated NiFePB suggesting the oxygen-riched surface of NiFePB.

Porous amorphous metallic NiFePB in a macroscopic strip morphology was synthesized through vacuum quenching molten mother alloy NiFePB. The obtained strip showed a smooth surface and was in shiny silver color, an indication of the metallic characteristic. The surface of the NiFePB was activated by dipping the strip in an acidic solution for 10 min, which created catalytically active sites accounting for metal oxides/hydroxides MOx/M(OH)x that have been identified as active sites in oxygen evolution reaction (OER). The X-ray diffraction (XRD) pattern of the activated NiFePB showed only one broad peak centered at 45°, which confirmed its amorphous structure. The amorphous feature of the a-NiFePB was also evidenced by the ring-like characteristic of the Fast Fourier transform (FFT) pattern, and transmission electronic microscopy (TEM) of the a-NiFePB near to the strip surface showed the surface was highly porous with pore sizes ranging 50~300 nm. Careful characterizations using high-resolution TEM (HRTEM) find the a-NiFePB possesses a porous skeleton. Elemental area mapping and line mapping illustrated that the core is interconnected as a skeleton with a very thin oxide layer (<10 nm) enclosed as a shell. This suggests the surface of NiFePB is converted to oxygen-containing functional groups, which is also evidenced by the quantified atomic percentages from the EDS spectrum FIG. 4. Such a structure protects the inner NiFePB core from successive oxidation during OER catalysis, and more importantly, would facilitate efficient electron transfer between the metallic NiFePB and the outer shell active sites.

X-ray photoelectron spectroscopy (XPS) revealed that the sample contained elements of Fe, Ni, P, B, and O. Individual spectrum was corrected with reference to C 1s binding energy of 284.5 eV and then deconvoluted using Gaussian fitting. The Fe 2p3/2 core level had two prominent peaks at 712.13 and 705.25 eV, corresponding to oxidative $Fe^{3+}$ and the metallic $Fe^0$, respectively, and no peak for $Fe^{2+}$ was detected. Ni 2p3/2 and Ni 2p1/2 core peaks and their satellite peaks were observed, with the core peaks being deconvoluted into two peaks at 855.65 and 857.23 eV and indexed to metallic $Ni(OH)_2$ and NiOOH, respectively. The B 1s spectrum was deconvoluted into two peaks at 189.77 and 191.85 eV, and the former is ascribed to metallic borides while the later can be assigned to oxidized borates species. P 2p3/2 peaks at 132.70 eV were assigned to phosphates. The XPS spectrum of the O 1s had intense peaks at ~530 and ~531 eV that corresponded to high surface contents of M-O bonds in metal oxides and M-OH bonds in metal hydroxides, respectively, which were in good agreement with the TEM observations of an oxidative shell on the a-NiFePB surface. The formation of the a-NiFePB phase was further characterized by X-ray absorption spectroscopy (XAS). Table 8 shows fitted bond length (R) and coordination numbers (CN) from the Ni and Fe K-edge extended X-ray absorption fine structure (EXAFS) spectra of the a-NiFePB processed through a Fourier-transform (FT). Nevertheless, the successful identification of Fe—P(B), Fe—Fe(Ni), Ni—P(B) and Ni—Fe(Ni) bonds is consistent with the XPS data and confirm the a-NiFePB bulk phase.

TABLE 8

The lengths of Ni—Ni, Fe—Fe, Fe—P, Ni—P, Fe—B, and Ni—B bonds and coordination numbers of Ni and Fe atoms in the activated NiFePB extracted from the curve-fitting of Ni and Fe K-edge EXAFS data.

| Sample | Bond | R(Å) | CN | $\sigma^2[10^{-3}Å^2]$ |
|---|---|---|---|---|
| NiFePB | Fe—P | 2.30 | 0.742 | 8.9 |
| | Fe—B | 2.30 | 0.323 | 13.0 |
| | Fe—Fe/Ni | 2.46 | 3.09 | 13.1 |
| | Ni—P | 2.22 | 0.60 | −1.45 |
| | Ni—B | 2.22 | 0.26 | −9.0 |
| | Ni—Fe/Ni | 2.48 | 3.94 | 14.1 |
| $Ni_2P$ | Ni—P | 2.22 | 4 | 5.4 |
| | Ni—Ni | 2.62 | 8 | 8.2 |
| NiO | Ni—O | 2.07 | 6 | / |
| FeP | Fe—P | 2.33 | 6 | 8.0 |
| | Fe—Fe | 2.69 | 4 | 9.8 |
| $Fe_2O_3$ | Fe—O | 1.94 | 3 | / |
| | Fe—O | 2.10 | 3 | / |
| $Fe_3O_4$ | Fe—O | 1.89 | 1.33 | / |
| | Fe—O | 2.06 | 4 | / |

To evaluate the electrochemical OER performance of the activated NiFePB, OER polarization curves were collected by conducting linear sweep voltammetry (LSV) in 1.0-M NaOH electrolyte using a standard three-electrode setup. The counter electrode was Pt mesh and the reference electrode was Ag/AgCl. iR-corrected LSV curves were plotted at a scan rate of 1 mVs$^{-1}$. The variation of the NiFePB composition slightly influenced the polarization. Significantly, the a-NiFePB exhibited an outstanding activity, evidenced from chronopotentiometry data FIG. 5 by a very low overpotential of 197 mV to reach a current density of 10 mA·cm$^{-2}$ ($\eta$10) and a mere 217 mV to achieve 100 mA·cm$^{-2}$ ($\eta$100). Noticeably, a pronounced redox peak initiating at about 180 mV overpotential was observed, implying a significant amount of active sites were generated. In sharp contrast, the NiFe alloy foam (NFF), NiFeOH/ITO thin film, and NiFeOH/NiFe alloy foam required much larger overpotentials to reach 10 mA·cm$^{-2}$, namely 255 mV, 290 mV, and 250 mV, respectively. The excellent OER activity property of the activated NiFePB surpasses state-of-the-art PGM catalysts such as $RuO_2$, $IrO_2$, and transitional metal boride or phosphide catalysts such as $FeB_2$ ($\eta 10=296$ mV), $Ni_xB$ ($\eta 10=302$ mV), $Ni_2P$ ($\eta 10=290$ mV), CoP ($\eta 10=281$ mV), NiCoP ($\eta 10=280$ mV), FeNiB ($\eta 100=270$ mV) and $Fe(PO_3)_2/Ni_2P$ (q100=221 mV). At overpotential of 230 mV, the a-NiFePB powered a current density of 200 $mA \cdot cm^{-2}$, while NiFeOH/ITO was nearly inactive and the NiFeOH/NFF only reached 2 $mA \cdot cm^{-2}$. A comparison of OER behavior showed a-NiFePB greatly surpassed the previous reported amorphous bulk material NiFeP in the prior example.

Considering the fact that the measured geometrical current density could be affected by the amount of catalyst, the electrochemically active surface area (ECSA)-specific current density better represents the intrinsic OER activity and allows direct comparison between different catalysts. Catalyst ECSA values were determined by measuring the double-layer capacitance ($C_{dl}$) at different scan rate in a non-Faradaic region of ±0.05 V versus open circuit potential (OCP). The activated NiFePB showed a Cdl of 358 $\mu Fcm^{-2}$, which was about 8 times higher than the untreated sample (45.67 $\mu Fcm^{-2}$), but much lower than other nanosized catalysts as summarized in Table 9. This indicates that extraordinary OER property is relatively dependent on the amplification of the surface area, and the ECSA-specific current density, i.e., intrinsic OER activity, of the activated NiFePB, is profoundly enhanced with other causes.

TABLE 9

Comparison of electrocatalytic OER performances for bulk NiFePB and other reported nanosized materials.

| Catalyst | η10 | Tafel slope (mVdec$^{-1}$) | BET/ESCA |
|---|---|---|---|
| NiFePB | 197 | 34 | 358 $\mu Fcm^{-2}$ |
| | 217 (η100) | | |
| $Co_3O_4$@CoO nanocubes | 430 | 89 | / |
| G-FeCoW on GC | 217 | 37 ± 2 | 198.6 $m^2/g$ |
| G-FeCoW on gold foam | 191 ± 3 | / | / |
| $FeB_2$ | 296 | 52.4 | 51 $m^2/g$ |
| NiFeP | 350 | 42 | 40.82 $\mu Fcm^{-2}$ |
| | 410 (η100) | | |
| NiCoP/NF | 280 | 87 | 4.9 $mFcm^{-2}$ |
| $Ni_2P$ | 290 | 59 | 176 $\mu Fcm^{-2}$ |
| CoP | 360 | 66 | / |
| $Ni_5P_4$ | 330 | 40 | / |
| CoMnP | 330 | 61 | / |
| $Ni_3B$ | 302 | 52 | 26.4 $m^2/g$ |
| | | | 2.54 $mFcm^{-2}$ |
| NiFeOH | 250 | 28 | 1.245 mF |

Figure 5:
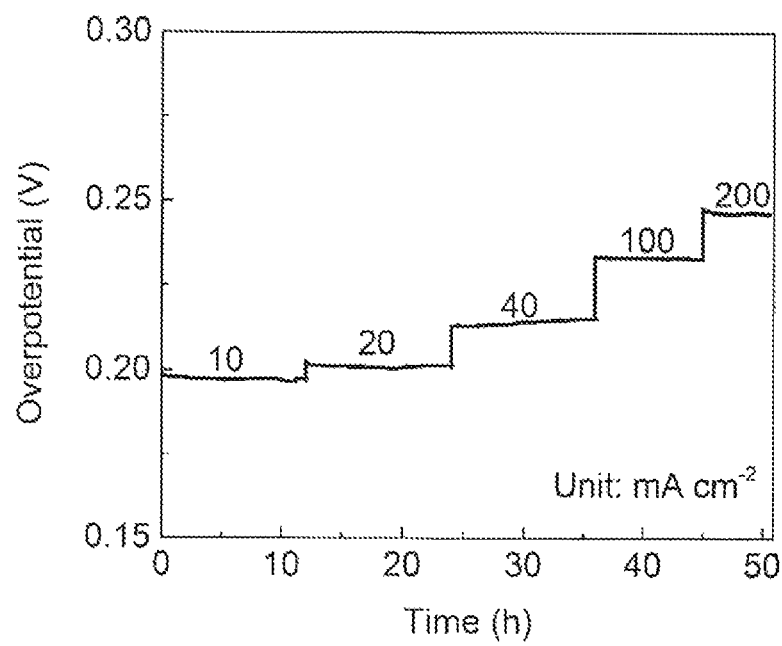
FIG. 5 shows the galvanic stability of the activated NiFePB under current densities of 10, 20, 40, 100, and 200 mA cm$^{-2}$.

The outstanding OER activity of the activated NiFePB is in good agreement with the measured Tafel slope of 34 $mVdec^{-1}$, which is the lowest compared to 38~45 $mVdec^{-1}$ for the NiFeOH or NiFe alloy foam and corresponds to the most favorable OER kinetics. The boost in OER kinetics of the a-NiFePB suggests synergistic effects of P and B atoms on the amorphous metallic bulk. Besides the exceptional OER activity, the a-NiFePB also exhibits excellent stability. The stability property is tested galvanostatically, a reliable criterion for evaluating a catalyst's lifetime, by performing chronopotentiometry at several designated current densities ranging from 10 to 200 $mA \cdot cm^{-2}$, as shown in FIG. 5. Long-time stability is also performed at a current density of 100 $mA \cdot cm^{-2}$ for 1400 hours, and the overpotential only increases by 104 mV, demonstrating the supreme catalyst activity. After stability test, the solution is analyzed by inductively coupled plasma mass spectrometry (ICP-MS), and Fe or Ni is not detected as shown in Table 10, indicating excellent long-term durability of the activated NiFePB catalyst's oxidized shell.

TABLE 10

The elemental mass percentage in the alkaline electrolyte after 1400-hour OER test with the activated NiFePB electrode.

| Elements | Mass percentage (%) |
|---|---|
| Fe | Not detected |
| Ni | Not detected |
| O | 0.675 |
| Na | 0.133 |
| P | 0.132 |
| Ca | 0.097 |
| K | 0.058 |
| Cl | 0.022 |
| Si | 0.017 |
| Cu | 0.005 |
| Zn | 0.002 |

The outstanding OER activity and long-term stability of the activated NiFePB can be attributed to the harmonized elemental synergy and unique porous amorphous structure. It is known that good conductivity is pivotal for allowing efficient electron transfer between the collector and active sites and avoiding unnecessary resistance in between and at catalyst interfaces. Density function theory (DFT) calculations were carried out to simulate the electron structure of a-NiFePB, NiFeP, and NiFe bulk. The density of state (DOS) of Fe atoms' 3d orbital splits obviously near the Fermi energy level, significantly increasing the electron density around the Fermi energy level. Moreover, the d electrons of both Fe and Ni are delocalized at the Fermi level to some extent, enhanced by the introduction of the P atom, and further enhanced by codoping of P and B atoms. The off-domain effect of electrons promotes electron transfer and improves conductivity. Overall, this indicates the presence of abundant free electrons and thus a metallic conductivity, as confirmed by the edge energy of the X-ray absorption near-edge structure (XANES) spectra. In comparison, the Ni/Fe (hydr)oxides are typically non-conductive. In this regard, we examine the impedance in reference to the NFF, NiFeOH/ITO, NiFeOH/NFF. Nyquist plots obtained from the electrochemical impedance spectroscopy (EIS) measurements showed performance at an overpotential of 300 mV. EIS data was fit using an established equivalent circuit model, which determined a much lower oxide resistance (Roxide) and interfacial charge transfer resistance (Rct) of the a-NiFePB in comparison with NiFeP and other catalysts Table 11. The data agree well with the DFT simulations and the ECSA-specific current density measurements that indicate both the high electrical conductivity and the promoted OER kinetics contribute to the outstanding activity property of the a-NiFePB.

TABLE 11

The simulation results according to the equivalent circuit model in FIG. 3f. Rsol: solution resistance; Rct: charge transfer resistance; Roxide: oxide resistance.

| Resistance, Ω | activated NiFePB | NiFe alloy foam | NiFeOH/ NFF | NiFeOH/ ITO | NiFeP |
|---|---|---|---|---|---|
| $R_{sol}$ | 2.777 | 2.798 | 2.838 | 3.030 | 2.936 |
| $R_{ct}$ | 0.050 | 0.385 | 0.247 | 11.850 | 15.86 |
| $R_{oxide}$ | 0.484 | 1.076 | 1.143 | 0.532 | 1.029 |

The promoted intrinsic OER activity could also be credited to the unique amorphous structure of the bulk material metal. Previous studies discovered a synergy between Ni and Fe oxidative active sites in OER electrocatalysis and the activity could be further promoted when the active sites are amorphous, which have been attributed to electronic interaction between the active sites and their more reactivity in an amorphous state. The thin oxidative layer on the activated NiFePB surface results from acid treatment, which is highly amorphous. Careful XPS characterizations show the activated NiFePB after OER cycling contains mostly Fe3+ and Ni4+ species in the surface region. Especially, the B 1s peak for boride largely disappears, and the borate bonds shift positively from 191.85 eV to 192.93 eV. Meanwhile, the peaks for P element disappear after the OER. Accordingly, the positively charged Fe3+ to 713.07 eV and Ni4+ to 858.40 eV. The XPS spectra of the O 1s region suggest that the activated NiFePB is covered with (hydr)oxide in the surface. Therefore the active sites of the catalyst are likely hydroxide species. Such amorphous hydroxide layer formation benefits from an amorphous nature of the a-NiFePB bulk phase and provides optimal active sites, leading to the boosted OER kinetics and thus the outstanding intrinsic activity.

The XPS results, indicate that the codoping of P and B atoms might tune the electronic structure of the activated NiFePB, which would help optimize this property to further improve the catalyst activity. The co-addition of P and B nonmetal elements into the a-NiFePB has a great impact on the behavior of the 3d metals. A first-principles calculation was conducted to systematically investigate the change in the d-band center, aiming at distinguishing the effects of B doping on electronic structure and OER activity. To reflect the nature of surface oxides that are formed during OER, 0 atoms are considered and introduced in the simulation models. In the absence of B and P dopants, the d-band DOS of Fe and Ni present two narrow peaks on both sides of the Fermi level. The electrons near to the Fermi level are mainly contributed by O's 2p orbitals. There is only a slight overlap between DOS of Fe and Ni's 3d orbitals and DOS of O's 2p orbital, which suggests that the electrons prefer to be confined at local states with limited exchange between p-d orbitals. When P is incorporated into the lattice, the peaks of state density are broadened to result in more overlaps, indicating an enhanced coupling between the p and d orbitals. After the introduction of B atoms into the lattice, the peaks of state density become even wider and 3d orbital DOS of Fe atoms splits at around the Fermi energy level. This finding suggests that the p-d hybridization has been further enhanced by B doping. By comparing the DOS of 3d orbital electrons, it is evident that the contribution of Fe and Ni to DOS near to the Femi level is greatly improved with the incorporation of B and P atoms that consequently improves the OER activity property of active sites. Furthermore, the d-band center of surface atoms was calculated. Compared with the undoped system, the d-band center of Fe and Ni atoms was shifted up towards the Fermi energy level induced by B and P doping. It is known that a narrower d-band center would be beneficial to strengthen chemical-active site interactions and in consequence the catalytic performance.

The superb stability property of the activated NiFePB would also be associated with the unique amorphous structure and intrinsically excellent activity. Many metal phosphides and borides are known for their excellent corrosion resistance, originating from their stable thermodynamics and intact surface oxide layer protection. Our DFT simulation of the NiFePB structure determines the formation enthalpy (OH) to be −0.414 eV (Table S5-S6), which is one order of magnitude more negative than that of NiFe alloy (−0.056 eV) and suggests its dramatically higher thermodynamic stability and oxidation resistivity. From atomic level, DFT was conducted to simulate the binding energy of O species on the surface of NiFe oxides and the a-NiFePB, as oxygen binding to metal atoms would induce over-oxidation that leads to oxide layer formation and thickening responsive to catalyst degradation. As calculated, the binding energy of O atom on NiFe is −0.232 eV/O, whereas the binding energy of O atom on the a-NiFePB is only −0.111 eV/O. The significantly smaller value indicates that O atoms bonded with surface NiFePB are easier to be removed, that would help to prevent over-oxidation of surface active sites. Moreover, the amorphous NiFePB is advantageous over the crystalline counterpart in regards of structural flexibility. This leads to intact surface oxide layer formation on integral NiFePB structure rather than on crystalline domains, and the excellent anti-oxidation assure a good conductivity since a relatively thinner layer on the a-NiFePB, which would better protect inner layer NiFePB from successive oxidation. Unequivocally, the excellent oxidation resistance of the a-NiFePB benefits the catalyst stability in two folds: it protects the a-NiFePB from being severely oxidized (within 10 nm from the surface), and it maintains favorable conductivity to allow efficient electron transfer between inner metallic NiFePB and active sites in the outer oxide layer. Notably TEM images of the surface of the a-NiFePB after running OER for 1400 hours, with XPS characterizations thereof, showed that the porous core-shell structure remained. The chemical status of Fe and Ni surface species and the porous structures largely remain with subtle changes compared to the freshly activated catalyst, confirming their good electrochemical stability.

What is claimed is:

1. An electrocatalytic material comprising:
   a bulk material metal including at least one metal, wherein the bulk material metal is selected from an alloy of at least one metal and at least two or more non-metals selected from phosphorus, boron, nitrogen, and carbon, and wherein the bulk material metal has a ratio of metal to non-metal of from 3:1 to 1:3;
   wherein the bulk material metal is in an amorphous form and includes mesopores; and
   wherein at least a surface portion of the electrocatalytic material is an oxidized layer, wherein the oxidized layer forms a shell over the bulk material metal, wherein the mesopores are disposed in the oxidized layer, wherein the electrocatalytic material is characterized by a porosity of from 0.01 $m^2/g$ to 100 $m^2/g$, and wherein the bulk material metal is a core having lower ohmic resistance than the shell.

2. The electrocatalytic material of claim 1, wherein the at least one metal is selected from iron, cobalt, nickel, copper, zinc, titanium, manganese, molybdenum, niobium, zirconium, and any combination thereof.

3. The electrocatalytic material of claim 2, wherein the bulk material metal is NiFePB.

4. The electrocatalytic material of claim 1, wherein the shell protects the core from further oxidation.

5. The electrocatalytic material of claim 1, wherein the at least two or more non-metals are phosphorus and boron.

6. A method for producing hydrogen gas comprising:
providing a reactor;
wherein the reactor further comprises:
- an anode;
- a cathode; and
- an alkaline electrolyte;

wherein the anode is an electrocatalytic material comprising
- a bulk material metal including at least one metal, wherein the bulk material metal is selected from an alloy of at least one metal and at least two or more non-metals selected from phosphorus, boron, nitrogen, and carbon, and wherein the bulk material metal has a ratio of metal to non-metal of from 3:1 to 1:3;
- wherein the bulk material metal is in an amorphous form and includes mesopores; and
- wherein at least a surface portion of the electrocatalytic material is an oxidized layer, wherein the oxidized layer forms a shell over the bulk material metal, wherein the mesopores are disposed in the oxidized layer, wherein the electrocatalytic material is characterized by a porosity of from 0.01 $m^2/g$ to 100 $m^2/g$, and wherein the bulk material metal is a core having lower ohmic resistance than the shell; and performing an alkaline electrolysis reaction to produce hydrogen gas.

7. The method according to claim 6, wherein the porous amorphous bulk material metal has a thickness and a width and a thickness to width ratio of from 1:100 to 1:1,000,000.

8. The method according to claim 6, wherein the shell protects the core from further oxidation.

\* \* \* \* \*